United States Patent
Webb et al.

[11] 3,970,546
[45] July 20, 1976

[54] METHOD AND APPARATUS FOR SEPARATING NON-FERROUS METAL FROM WASTE MATERIAL

[75] Inventors: Clyde B. Webb; Frank S. Knoll, both of Jacksonville, Fla.

[73] Assignee: Carpco, Inc., Jacksonville, Fla.

[22] Filed: June 4, 1974

[21] Appl. No.: 476,281

[52] U.S. Cl. ................................. 209/3; 209/12; 209/128; 241/24
[51] Int. Cl.² ..................... B03B 1/00; B03C 7/04
[58] Field of Search .......................... 209/127–131, 209/12; 241/DIG. 38, 20, 24; 317/262 A, 262 E; 55/150

[56] References Cited
UNITED STATES PATENTS

| | | | |
|---|---|---|---|
| 2,187,637 | 1/1940 | Sutton | 209/127 A |
| 2,314,939 | 3/1943 | Hewitt | 209/127 R |
| 3,031,079 | 4/1962 | Boss | 209/128 |
| 3,236,604 | 2/1966 | Pierson | 241/DIG. 38 |
| 3,249,225 | 5/1966 | Stuetler | 209/129 |
| 3,322,275 | 5/1967 | Breakiron | 209/127 R |
| 3,650,396 | 3/1972 | Gillespie | 209/3 |
| 3,775,104 | 11/1973 | Matsumoto | 317/262 A X |
| 3,800,153 | 3/1974 | Matsumoto | 317/262 A X |
| 3,897,330 | 7/1975 | Rhys | 209/128 |

FOREIGN PATENTS OR APPLICATIONS

| | | | |
|---|---|---|---|
| 681,171 | 3/1964 | Canada | 209/127 R |

*Primary Examiner*—Robert Halper
*Attorney, Agent, or Firm*—Schuyler, Birch, Swindler, McKie & Beckett

[57] ABSTRACT

Apparatus for separating non-ferrous metal from waste material comprising a grounded rotary conductive drum, means for feeding waste material to the drum, a D.C. corona electrode, an A.C. corona electrode, a D.C. static electrode and a splitter. The method of separation comprises magnetic separation of ferrous metals, sizing of the waste material, preliminary classification to remove dust and low density particles, drying to reduce the moisture content, feeding the waste material to the rotating grounded roll and subjecting the material successively to D.C. corona discharge, A.C. corona discharge and a D.C. electrostatic field.

25 Claims, 2 Drawing Figures

METHOD AND APPARATUS FOR SEPARATING NON-FERROUS METAL FROM WASTE MATERIAL

BACKGROUND OF THE INVENTION

It has become apparent that the earth's natural resources are not unlimited and that mankind's ultimate survival depends on proper conservation of those resources, both by controlling the depletion of raw materials and by eliminating pollution of our land, water and atmosphere. At the same time the world-wide desire for an ever increasing standard of living provides a great pressure for rapid production and consumption of goods at the lowest possible immediate cost. Faced with resolving these conflicting demands, planners are increasingly turning to the concept of recycling to provide efficient utilization of raw materials, reduce the output of pollutants and maintain an acceptable supply of goods for our economy.

One class of materials which are prime candidates for recycling, is the non-ferrous metals, particularly aluminum. Aluminum accounts for more than 95 percent of the non-ferrous metal content of municipal waste in most localities. The resistance of aluminum food and beverage containers and other aluminum articles to degradation makes them particularly obnoxious pollutants because of their relative permanency. Further, the high economic value of aluminum coupled with the vast amounts of energy which must be expended to obtain aluminum metal from natural ores, make the recycling of aluminum economically attractive.

The principal obstacle in recycling non-ferrous metals such as aluminum is the difficulty of separating them from other waste materials. The usual route of discarded aluminum food and beverage containers and other aluminum objects is through municipal waste systems which yield a thoroughly co-mingled mixture of materials of staggering diversity.

Electrostatic separation has been practiced for years, primarily in the treatment of grains and mineral ores. Actually the use of the term "electrostatic" is a misnomer because most so-called "electrostatic separators" leak an appreciable current between electrodes and thus are dynamic instead of static in operation. Consequently, the term "high tension separation" is to be preferred and will be utilized throughout the remainder of this specification. Efficient operation of high tension separations has generally required reduction of ore particles to small size because only very narrow size ranges and low mass particles could be effectively separated. Although mineral ores are not usually considered homogeneous mixtures, they are much more homogeneous than municipal waste, which incorporates the most diverse types of materials conceivable and is probably the most heterogeneous mixture known. The very heterogeneous nature of municipal waste coupled with the vast bulk of the material and the comparatively low economic value of the majority of the constituents has made it impractical to attempt to reduce the waste to small and relatively uniform particle sizes of the magnitude thought essential for efficient high tension separations. Thus, prior efforts to apply high tension separation techniques to the treatment of municipal waste have not been successful.

A further problem which arises in attempts to separate non-ferrous metals from municipal waste by high tension separation methods, is the inclusion of large amounts of lower conductivity conductive materials in the collected non-ferrous metal material. The expression low conductivity conductive materials is intended to refer to materials having a resistivity greater than about $10^{-2}$ ohms per cm. at 20°C. High tension separation methods are most effective in separating good conductors from substantial non-conductors, e.g., in separating the conductive metal wire from the non-conductive insulation in shredded electrical wire scrap. High tension separation techniques are much less selective in separating low conductivity conductive materials from other conductive materials such as the non-ferrous metals. Particular difficulty is encountered in attempting to separate aluminum from waste streams containinng appreciable amounts of damp or wet wood which has a lower, but nevertheless appreciable conductivity. Accordingly, the separation of non-ferrous metals from municipal waste streams which usually include more low conductivity conductive constituents such as damp wood than they do highly conductive non-ferrous metal constituents such as aluminum, presents special problems.

It is an object of this invention to provide an apparatus and a method for separating non-ferrous metal from municipal waste.

It is a further object of this invention to provide an apparatus and method capable of operating efficiently on feed material having particle sizes substantially larger than previously processed by high tension methods.

It is a further object of this invention to provide an apparatus and method for separating non-ferrous metal from waste material which can produce material of high non-ferrous metal content from mixtures containing amounts of non-ferrous metal and substantial amounts of low conductivity conductive materials.

It is also an object of this invention to provide a method for separating non-ferrous metals from waste material which can be conveniently added onto existing waste processing installations with little or no modification of the rest of the ongoing process.

Further objects of this invention will be apparent from a consideration of the specification.

SUMMARY OF THE INVENTION

We have found that by sizing municipal waste to a particle size not more than about 4 inches, preferably less than about 3 inches, feeding the sized waste material to a grounded electrode, pinning the waste material to the grounded electrode by D.C. corona discharge, subjecting the waste material to A.C. corona discharge to maintain low conductivity conductive particles pinned to the electrode, and subjecting the waste material to a D.C. electrostatic field whereby a charge of opposite polarity is induced in the highly conductive non-ferrous metal particles and they are attracted away from the grounded electrode, a material having a high content of non-ferrous metal can be collected. Further refinements of the invention involve subjecting the feed material to magnetic separation to remove ferrous metals, use of air classification to remove fine particles and low bulk density materials, drying the feed material to low moisture content, the use of additional D.C. or A.C. corona electrodes, multi-stage high tension treatment of the waste material, and air tabling of the collected fraction to separate heavy metals.

BRIEF DESCRIPTION OF THE DRAWINGS

The invention will be further described with reference to the accompanying drawings wherein.

DETAILED DESCRIPTION OF THE PREFERRED EMBODIMENTS

Figure 1:
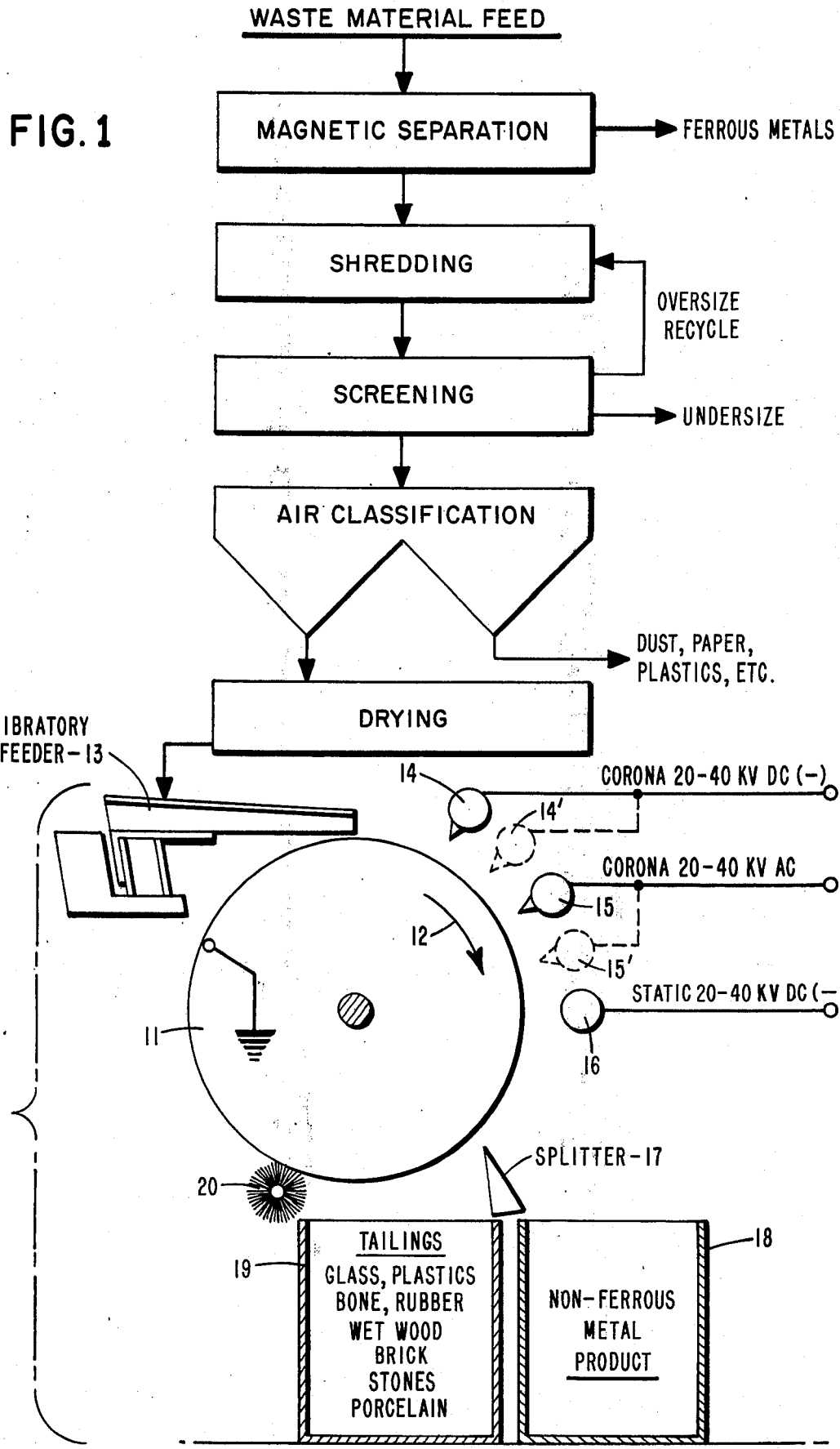
FIG. 1 is a schematic representation of the apparatus of the invention and one preferred method of operation.

FIG. 1 shows a schematic representation of the apparatus of the invention and a general scheme for the method of the invention. The high tension separator apparatus is generally designated by reference numeral 10 and comprises a rotatable conductive roll 11 which is connected to ground potential. Roll 11 is also connected to drive means, not shown, such as an electric motor in such a way that it may be continuously rotated. In the drawing, roll 11 rotates in a clockwise direction as indicated by arrow 12. A vibratory feeder 13 is positioned to feed particulate waste material to the top of roll 11.

Preferably, the drum has a diameter in the range from 14 to 24 inches. Drums having diameters as small as 6 inches may be used although efficiency may be somewhat less due to the small size of the treatment zones. Drums up to 36 inches or more in diameter are useful, but require large and bulky apparatus and somewhat lessen convenience in the processing installation. The speed of rotation of the electrode may range from 8 to 25 revolutions per minute or higher; the preferred range being from 10 to 18 revolutions per minute. The roll size and speed must be correlated to avoid excessive centrifugal force which acts to throw material off the roll. At large drum diameters and relatively high rates of rotation, the centrifugal force acting on the waste material particles may make it difficult to effectively pin waste material particles to the roll surface.

An ion bombardment or corona discharge electrode 14 connected to a 20 to 40 kilovolt source of negative D.C. potential is disposed at about the 1 o'clock position spaced a short distance from the periphery of the rotatable grounded roll. Current leaking from electrode 14 ionizes adjacent air molecules which then move toward the rotating roll thus subjecting particulate material on the surface of the roll to a bombardment of negative ions.

A second ion bombardment or corona discharge electrode 15 connected to a 20 to 40 kilovolt source of alternating current potential is disposed at about the 2 o'clock position spaced from the periphery of the rotating conductive roll. Electrode 15 is adapted to subject particulate material travelling with the surface of the rotating roll to an A.C. corona.

Preferably corona discharge electrodes 14 and 15 are of the beam or focusing type illustrated and described in Carpenter U.S. Pat. No. 2,548,771, which is hereby expressly incorporated in this specification by reference. The Carpenter electrodes comprise a small diameter wire and a relatively large diameter tube or rod parallel to each other. Both the wire and the tube are charged with high voltage. Since corona discharge preferentially takes place from sharp corners or tightly curved surfaces, discharge from the electrodes takes place almost exclusively from the wire portion. In the absence of the large diameter tube, the discharge would radiate equally in all directions from the wire, but the presence of the charge on the tube causes the discharge from the wire to be repelled away from the tube and toward the rotating electrode. The discharge is thus said to be beamed toward or focused on the grounded electrode. The electric field established between the ionizing electrodes and the grounded rotating drum also causes the ions to flow toward the grounded electrode.

If desired a second D.C. corona discharge electrode 14' may be included between D.C. corona electrode 14 and A.C. corona electrode 15. The use of two D.C. corona electrodes assures maximum ion bombardment charging of the waste material particles. Likewise a second A.C. corona discharge electrode 15' may be disposed between A.C. corona electrode 15 and D.C. static electrode 16. The use of the second A.C. corona electrode helps to assure that intermediate conductivity particles retain a residual charge which holds them against the rotating roll under the influence of the static field.

A third electrode connected to a 20 to 40 kilovolt source of direct current potential is disposed at about the 3 o'clock position spaced from the periphery of the rotating conductive roll. This electrode, designated by reference numeral 16, is a non-ionizing static electrode designed for minimal leakage of current between the electrode and the conductive roll, so that a static field only is created between electrode 16 and the surface of roll 11. Inasmuch as leakage or discharge from high tension electrode is most apt to occur from a sharp point or a sharply curved surface, electrode 16 is preferably formed as a comparatively large diameter smooth tubular conductive member having no sharp corners or small radius curved segments. A 4 inch diameter aluminum tube is satisfactory. Particulate material travelling with the surface of the rotating roll 11 is thus subjected to the influence of a D.C. electrostatic field as it passes static electrode 16.

Each of the electrodes is positioned a short distance from the rotating grounded roll, preferably in the range from about 2 to about 4 inches. The electrodes need not, however, all have the same spacing from the rotating roll, but each may have a different spacing for maximum efficiency. Optimum spacings within the range depend on the conditions of each separation and can be determined empirically.

At about the 5 o'clock position is a splitter 17 which serves to cut off material not tightly pinned to roll 11 and deflect such material into a product collecting bin 18. The splitter is located at or near the end of the effective electrostatic field between the static electrode and the grounded roll. The splitter is positioned a short distance from the rotating grounded roll, preferably in the range from about 2 inches to about 4 inches.

A tailings collecting bin 19 is positioned to catch material which travels past the splitter 17. An optional brush 20 may be provided to remove any material which adheres to the roll.

The positions of the corona discharge and static electrodes may be made adjustable with respect to the rotating grounded drum by mounting them on pivotable arms, so that the spacing between the electrodes and the rotating roll can be varied at will in order to adjust to varying operating conditions.

Likewise, the splitter may be movably mounted in order to facilitate adjustment of the spacing between the splitter and the rotating roll in order to optimize the separation of various material compositions.

The operation of the apparatus and the process of separation are as follows. Waste material, just as it comes from the collecting trucks, is first subjected to magnetic separation to remove ferrous metal objects. Details of such separation are conventional and form no part of the subject matter of our invention. The waste material is then subjected to shredding, e.g., in a hammer mill, to break up large objects into smaller particles. Size reduction can be accomplished by conventional shredding (dry) or pumping (wet) techniques. After size reduction the waste passes to a screening device wherein oversize and undersize particles are separated. The oversize particles are recycled to the shredder. Undersize particles are separated from the process stream. The high tension separation is effective on particles having sizes up to about 4 inches. For effective operation, the smallest particles should be not less than one-eighth the size of the largest particles; most preferably not less than one-third the size. Thus if the final stage of the screening operation is a 1 inch screen, particles as small as ⅛ inch may be fed to the separator. If 4 inch material is passed through the screening operation, the minimum particle size should be about ½ inch. Particle sizes referred to are somewhat approximate; a 4 inch maximum particle size refers to particles which will pass through a 4 inch mesh screen, and it is recognized that some particles having a maximum dimension slightly larger than 4 inches may pass through such a screen. It is preferred that the top size of the waste material treated by not more than about 3 inches; most preferably not more than about 2 inches.

From the screening operation the material is next subjected to air classification wherein low bulk density material such as dust, dry paper and light plastics are separated. A cyclone separator may be utilized to effect the classification. Material having a bulk density less than about 1.0 grams per cm.$^3$ should be removed; it is preferred to remove material having a bulk density less than about 2.0 grams per cm.$^3$. Dust removed in the classification step otherwise might tend to foul the electrodes in the high tension separator or to provide an avenue for undesirable current leakage from the static electrode.

The importance of the surface area to mass ratio of the particles should be noted. The force urging the particles against the rotating roll depends on the charge applied to the particles which in turn depends on the surface area of the particles. The forces opposing the pinning forces includes significant contributions from centrifugal force and the force of gravity both of which depend on the mass of the particles. Accordingly, particles having a large surface area to mass ratio will be more effectively pinned to the rotating roll thereby resulting in greater separation efficiency. A convenient index of the surface area to mass ratio is the shape factor of a typical particle. The shape factor is the ratio of the maximum dimension (length) of the particle to the minimum dimension (thickness) thereof. Best separations result when the feed material has an average shape factor lying in the range between 15 and 25 to 1.

The waste material is then subjected to drying to reduce the moisture content to a level less than about 3 percent. Most preferably the moisture content is reduced to less than about 1 percent. Excessive surface moisture is objectionable in that it can provide a conductive path through which charges applied to otherwise non-conductive particles by the ion bombardment from the corona electrodes may be dissipated by conduction to the grounded roll. By reducing the surface moisture content of the waste material stream, the resistivity of low conductivity conductive material is maintained at a high enough level for effective separation.

It is recognized that the moisture content will affect the bulk density of some of the particulate material. Where there is an abundance of wet, low bulk density material in the waste material feed, it may be desirable to carry out the drying prior to the air classification step. Normally, it is preferred to carry out the air classification prior to the drying operation in order to reduce the amount of material which must be dried. Rotary tumbling dryers may be used to carry out the drying operation. Ambient temperatures are normally sufficient for most separation applications, however, particularly where the moisture content of the waste material is high, temperature control measures may be advisable.

The shredded, classified and dried waste material is then passed to a vibratory feeder which feeds it to the top of the rotating grounded drum. Acceptable feed rates depend not only on the roll size and speed, but also on the bulk density, moisture content, and size ratio of the largest to smallest particles in the feed material. Generally where the bulk density is greater than about 1.0 gram per cm.$^3$ and the size ratio of the largest to smallest particles ranges up to about 8 to 1, the feed rate should lie in the range from about 50 to about 100 pounds per hour per inch of roll length. Where the bulk density of the feed material is not less than about 2.0 grams per cm.$^3$ and the size ratio of the largest to smallest particles is not more than about 3 to 1, the feed rate may range up to about 200 pounds per hour per inch of roll length.

The waste material travels with the surface of the rotating roll past the D.C. corona discharge electrode. The electrode may be either negative or positive in polarity, but for purposes of subsequent discussion a negative electrode will be considered. The electrode ionizes molecules of the surrounding atmosphere and directs them toward the grounded roll, so that the waste material is subjected to ion bombardment as it passes the corona electrode. Many of the ions discharge against the waste material, thus leaving a negative surface charge, the same polarity as the D.C. corona electrode, on the surfaces of the waste particles. An electric field, of course, exists between the corona electrode and the grounded roll, and the interaction of this field with the charge applied to the waste particles, urges the particles against the rotating roll, thus pinning the particles to the grounded electrode.

As the pinner particles continue to rotate with the surface of the roll, the surface charge applied to highly conductive particles, such as aluminum or other non-ferrous metal particles, tends to discharge rapidly under the influence of the electric field by conduction through the particle to the grounded roll. Waste particles of materials with high dielectric values, such as glass, cannot lose the applied charge by conduction and thus remain firmly pinned to the rotating roll. Waste particles of materials having conductivities intermediate those of the highly conductive non-ferrous metals and the highly insulating material particles, tend to lose their charge, but at a much slower rate than the non-ferrous metal particles.

Passing the D.C. corona electrode, the waste material approaches the A.C. corona electrode and is subjected to a rapidly alternating corona and electric field. The effect of the alternating corona and electric field on highly insulating waste material particles is largely self-cancelling so that these particles retain the greater portion of the surface charge originally applied by the D.C. corona electrode. Highly conductive ferrous metal particles again rapidly lose by conduction any charge applied by the A.C. corona electrode. However, the alternating ion bombardment and electric field of the A.C. corona electrode tends to prevent particles of intermediate conductivity from completely losing all of the charge applied by the D.C. corona electrode. Without wishing to be bound by any particular theory for this result, it may be postulated that the discharge time for the low conductivity conductive particles is greater than one-half the cycle time of the A.C. electrode so that the rapid reversal of the electric field prevents continued conduction of the surface charge for a period of time long enough to completely discharge the particles.

The waste material continues to travel with the roll of the surface past the A.C. corona electrode and enters a strong electrostatic field imposed between the static D.C. electrode and the grounded roll. The static field has a tendency to induce a charge on the waste particles opposite in polarity to that of the electrode on the waste particles by attracting or repelling electrons from the grounded roll. If the static electrode is negative, electrons will be repelled from the waste particles to the grounded roll and a positive charge induced on the waste particles. This effect is most pronounced on non-ferrous metal particles where conduction to and from the grounded roll can occur relatively freely. The effect is minimal on the highly insulating particles and particles of intermediate conductivity; any charge induced by the static field being negligible in comparison with the surface charge applied by the corona electrodes. Since the highly insulative particles and the particles of intermediate conductivity retain at least a significant amount of the charge orignally applied by the D.C. corona electrode and since the polarity of the static electrode is the same as that of the D.C. corona electrode, the insulating particles and particles of intermediate conductivity remain pinned to the grounded roll under the influence of the electrostatic field. On the other hand, because the charge originally applied to the highly conductive non-ferrous metal particles by the corona discharge electrodes has largely been lost by conduction to the grounded roll and a charge of opposite polarity has been induced on such particles by the electrostatic field, the conductive non-ferrous metal particles are actually attracted away from the grounded roll toward the static electrode. The momentum acquired by such particles as they travel with the surface of the rotating roll coupled with the effect of the electrostatic field and the influence of gravity causes such particles to assume a trajectory which leads them to a collecting bin or chute. Non-conductive particles and particles of intermediate conductivity remain pinned to the roll and pass between the roll and the splitter. Non-ferrous metal particles which are less strongly attracted away from the roll are deflected by the splitter into the product collecting bin or chute.

The splitter is located a short distance from the rotating grounded roll near the end of the effective electrostatic field imposed between static electrode and the grounded roll. Once past the splitter, the non-conductive particles and particles of intermediate conductivity are no longer subjected to an effective electrostatic field urging them against the roll surface. Consequently, they fall under the influence of gravity into a second collecting bin or chute. This tailings fraction comprises principally glass, bone, wood, brick, stones, porcelain and other ceramic materials. Any of the tailings material which continues to adhere to the rotating roll is released from the roll by the rotating brush 20 which sweeps it into the tailings bin.

Electrical potentials between about 20 and about 40 kilovolts can be applied to the separator electrodes, however, under most circumstances the best balance of economy and efficiency results when the electrode potentials lie between 25 and 35 kilovolts.

Figure 2:
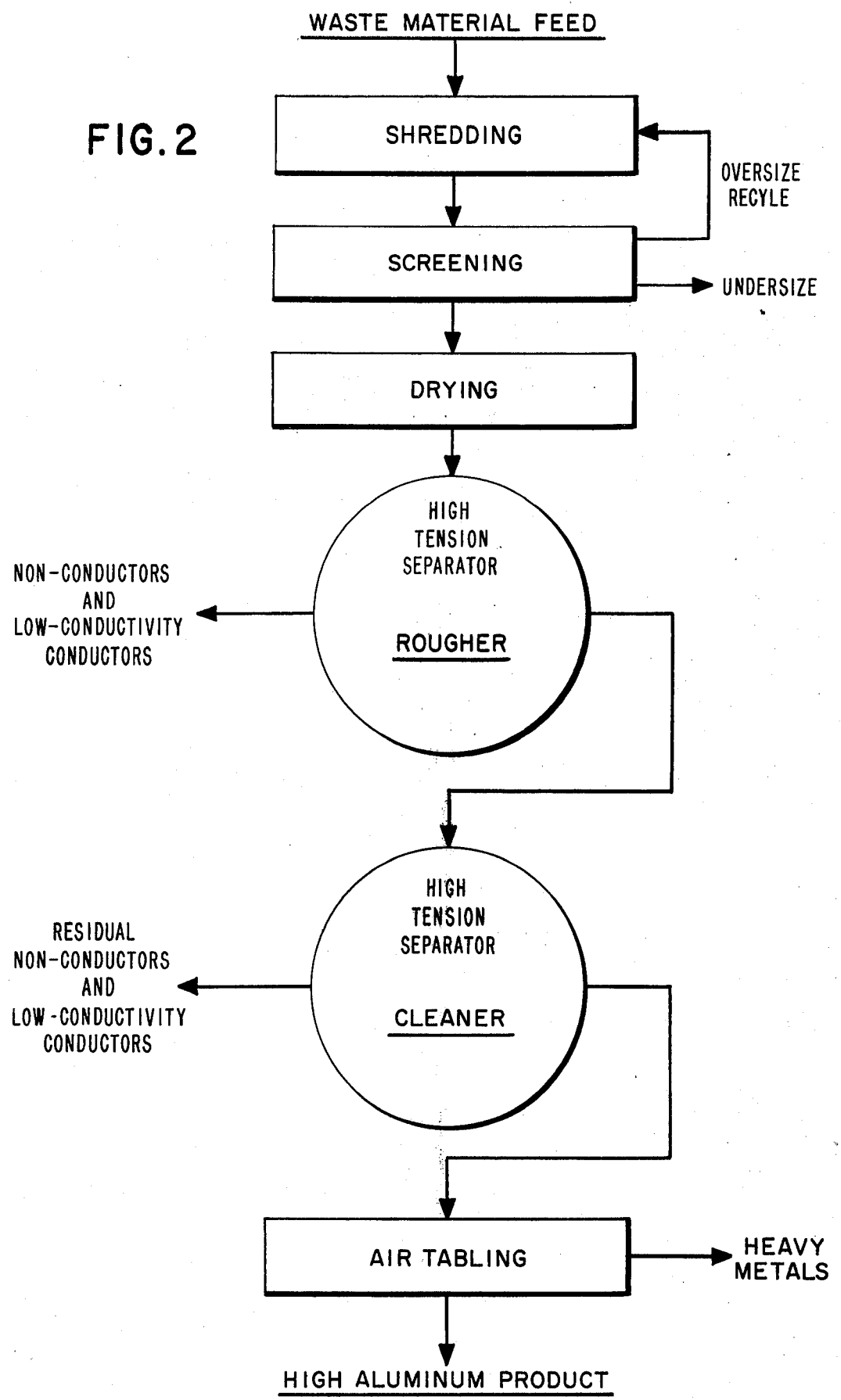
FIG. 2 is a flow chart representation of a second preferred embodiment of the method of the invention.

A single high tension separation stage may be sufficient to collect a useful non-ferroous metal product. However, under circumstances where the non-ferrous metal content of the feed material is particularly low, or where the presence of other materials in the collected non-ferrous metal fraction is unacceptable, multi-stage separation may be called for. FIG. 2 illustrates a two stage high tension separation scheme for removing aluminum from waste material. The waste material is shredded, screened and dried as previously discussed in conjunction with the embodiment illustrated in FIG. 1. The appropriately sized and dried waste material is then passed to the vibratory feeder of a high tension separation apparatus such as designated by reference numeral 10 in FIG. 1. This is designated the rougher stage. Operating parameters of the rougher stage correspond substantially to those given for the single separation stage discussed in conjunction with FIG. 1. The rougher stage serves to remove most of the non-conductors and low conductivity conductors from the waste material. However, the collected aluminum containing fraction includes a substantial residual amount of non-conductive and low connductivity conductive material. The aluminum containing product is therefore passed to a second high tension separator which also corresponds substantially to the separator 10 illustrated in FIG. 1. This is designated the cleaner stage of the separation procedure. Operating parameters of the cleaner stage differ somewhat from those of the rougher stage. The roll speed is slower so that centrifugal forces which tend to throw material off of the roll are less, the voltages applied to the corona electrodes are somewhat greater so that maximum charge is applied to the waste material particles, and the splitter spacing from the rotating rounded roll is somewhat greater so that low conductivity conductive particles which are attracted slightly away from the roll by the electrostatic field are not deflected into the product bin. The collected material may thereafter be subjected to air tabling to separate out heavy metals from the aluminum product.

EXAMPLE

The usefulness of the invention is demonstrated by the following test. A synthetic waste material comprising 16 percent aluminum and less than 1 percent other metal, 10 percent wood, 23 percent plastics, 23 percent rubber, 8 percent textiles and about 20 percent other materials such as paper, fiber, and the like was sized to a range between about ¼ and 2 inches and fed to a high tension separator apparatus such as the one designated by reference numeral 10 in FIG. 1 utilizing a single D.C. pinning electrode, a single A.C. corona pinning electrode and a single D.C. electrostatic attracting electrode. The total metal content of the feed material was about 16.2 percent. A single pass through the high tension separator resulted in isolation of a metal containing fraction comprising 21.5 percent of the feed material. The collected fraction contained about 70.0 percent metal resulting in a recovery of 92.7 percent of the metal present in the feed material.

The foregoing embodiments have been described solely for the purposes of illustrating the invention, and not by way of limintation. Since modifications of the process anad apparatus of the invention may occur to those skilled in the art, the scope of the invention is to be limited solely by the scope of the following claims.

We claim:

1. A method for separating non-ferrous metal from waste material comprising non-ferrous metal and low conductivity conductive material; said method comprising the steps of:
   a. sizing the waste material to a particle size not more than about 4 inches;
   b. feeding the sized waste material particles to a grounded electrode;
   c. pinning the waste material particles to said grounded electrode by subjecting the waste material particles to ion bombardment from a D.C. corona discharge electrode;
   d. maintaining the low conductivity conductive particles pinned to said grounded electrode by subjecting the waste material particles to discharge from an A.C. corona discharge electrode;
   e. inducing a charge, opposite in polarity to said D.C. corona discharge electrode, on the non-ferrous metal particles and attracting the non-ferrous metal particles away from said grounded electrode by subjecting the waste material particles to an electrostatic field imposed between a static D.C. electrode and said grounded electrode; said static D.C. electrode having the same polarity as said D.C. corona discharge electrode; and
   f. collecting the non-ferrous metal particles.

2. A method as recited in claim 1 further comprising the step of subjecting the waste material to magnetic separation to remove ferrous metal prior to feeding the waste material to the grounded electrode.

3. A method as recited in claim 1 further comprising the step of subjecting the waste material to preliminary classification to remove fine particles and material of low bulk density prior to feeding the waste material to the grounded electrode.

4. A method as recited in claim 3 wherein said preliminary classification is effected by air classification.

5. A method as recited in claim 4 wherein the waste material fed to said grounded electrode has a bulk density greater than about 1.0 g./cm.$^3$; the size ratio of the largest to smallest particles in said material fed to the grounded electrode is not more than about 8 to 1, and said material is fed to the electrode at a rate lying in the range from about 50 to about 100 pounds per hour per inch of electrode length.

6. A method as recited in claim 5 wherein the waste material fed to the grounded electrode has a bulk density greater than about 2.0 g./cm.$^3$; the size ratio of the largest to smallest particles in the material fed to the grounded electrode is not more than about 3 to 1, and said waste material is fed to the grounded electrode at a rate lying in the range from about 100 to about 200 pounds per hour per inch of electrode length.

7. A method as recited in claim 1 further comprising the step of reducing the moisture content of the waste material to less than about 3 percent.

8. A method as recited in claim 7 wherein the sizing of the waste material is effected by shredding and screening; the moisture content of the waste material is reduced to less than about 1 percent; and the resistivity of said low conductivity conductive material after reduction in the moisture content is greater than about $10^{-2}$ ohms per centimeter at 20°C.

9. A method as recited in claim 1 wherein said grounded electrode comprises a rotating conductive roll.

10. A method as recited in claim 9 wherein the diameter of said roll lies in the range from about 6 to about 36 inches.

11. A method as recited in claim 10 wherein the diameter of said roll lies in the range from about 14 to about 24 inches; the rate of rotation of said roll lies in the range from about 8 to about 25 revolutions per minute; and the polarity of said D.C. corona electrode and said D.C. static electrode is negative.

12. A method as recited in claim 9 wherein waste material having a particle size less than about ⅛ inch is removed prior to feeding the waste material to said grounded electrode.

13. a method as recited in claim 12 wherein the particle size of the waste material fed to the grounded electrode lies in the range from about ¼ inch to about 3 inches; and the waste material particles have an average shape factor lying in the range from about 15 to about 25.

14. A method as recited in claim 1 wherein the D.C. corona electrode, the A.C. corona electrode and the D.C. static electrode are charged with potentials lying in the range from about 20 to about 40 kilovolts.

15. A method as recited in claim 14 wherein the D.C. corona electrode, the A.C. corona electrode, and the D.C. static electrode are charged with potentials lying in the range from about 25 to about 35 kilovolts.

16. A method as recited in claim 1 wherein the collected non-ferrous metal material includes residual non-conductive and low conductivity conductive material, further comprising the steps of:
   feeding the collected material to a second grounded electrode;
   pinning the collected material to said second grounded electrode by subjecting the collected material to ion bombardment from a second D.C. corona discharge electrode;
   maintaining the low conductivity conductive particles pinned to said second grounded electrode by subjecting the collected material to discharge from a second A.C. corona discharge electrode;
   inducing a charge on the non-ferrous metal material opposite in polarity to said second D.C. corona discharge electrode and attracting the non-ferrous metal material away from said second grounded electrode by subjecting the collective material to an electrostatic field imposed between a second static electrode and said second grounded electrode; said second static electrode having the same polarity as said second D.C. corona discharge electrode.

17. A method as recited in claim 1 wherein the collected non-ferrous metal material includes residual amounts of other materials, further comprising the step of subjecting the collected material to air tabling.

18. Apparatus for separating non-ferrous metal from waste material comprising non-ferrous metal and low conductivity conductive material, said apparatus comprising:
   a. a grounded conductive roll adapted for rotation in one direction;
   b. means for feeding waste material to said roll at a first sequential point;
   c. a D.C. corona electrode at a second sequential point in the direction of rotation of the roll, spaced from the periphery of the roll and adapted to subject material on the roll to D.C. corona discharge;
   d. an A.C. corona electrode at a third sequential point in the direction of rotation of the roll, spaced from the periphery of the roll and adapted to subject material on the roll to A.C. corona discharge; and
   e. a D.C. static electrode at a fourth sequential point in the direction of rotation of the roll, spaced from the periphery of the roll and adapted to subject material on the roll to an electrostatic field imposed between said static electrode and the grounded roll.

19. Apparatus as recited in claim 18 wherein said roll has a diameter lying in the range from about 6 to about 36 inches.

20. Apparatus as recited in claim 19 wherein said roll has a diameter lying in the range from about 14 to about 24 inches.

21. Apparatus as recited in claim 18 wherein said D.C. corona electrode and said A.C. corona electrode are focusing electrodes.

22. Apparatus as recited in claim 18 wherein said D.C. corona electrode, said A.C. corona electrode, and said D.C. static electrode are each spaced from said roll a distance lying in the range from about 2 to about 4 inches and are adjustably mounted whereby the spacing between each of said electrodes and said roll can be individually varied.

23. Apparatus as recited in claim 18 further comprising a splitter at a fifth point in the direction of rotation of said roll spaced from the roll a distance lying in the range from about 2 to about 4 inches and adjustably mounted whereby the spacing between said splitter and the roll can be varied.

24. Apparatus as recited in claim 18 further comprising a second D.C. corona electrode between said D.C. corona electrode and said A.C. corona electrode, spaced from said roll and adapted to subject material on the roll to D.C. corona discharge.

25. Apparatus as recited in claim 18 further comprising a second A.C. corona electrode between said A.C. corona electrode and said D.C. static electrode, spaced from said roll and adapted to subject material on the roll to A.C. corona discharge.

* * * * *